Dec. 26, 1950     A. R. CANFIELD     2,535,389
MACHINE FOR MOLDING CONCRETE BLOCK, BRICK OR TILE
Filed March 8, 1948     3 Sheets-Sheet 2

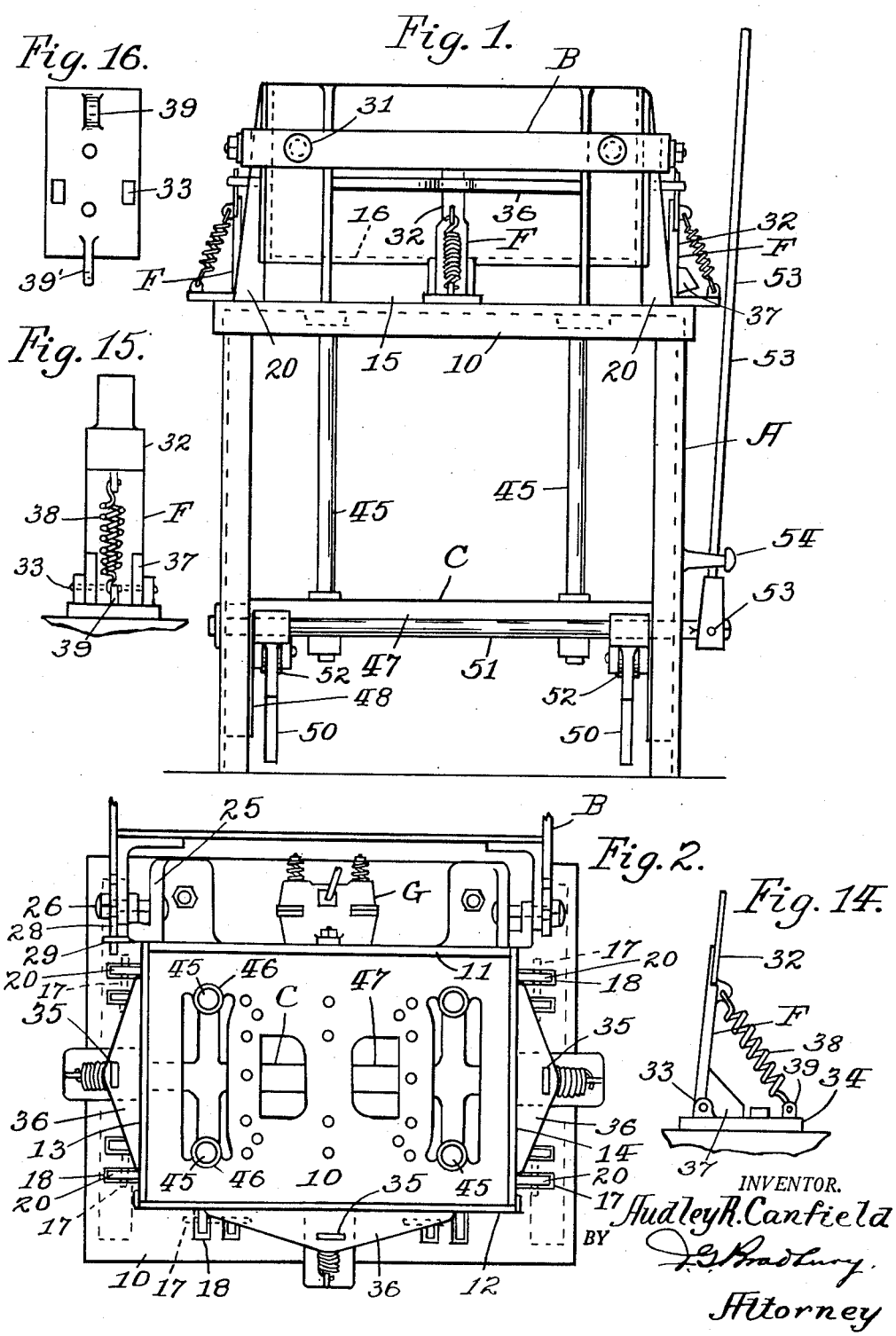

INVENTOR.
Audley R Canfield
BY
Attorney

Dec. 26, 1950 A. R. CANFIELD 2,535,389
MACHINE FOR MOLDING CONCRETE BLOCK, BRICK OR TILE
Filed March 8, 1948 3 Sheets-Sheet 3
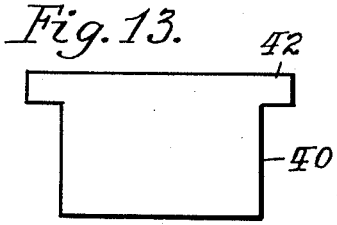
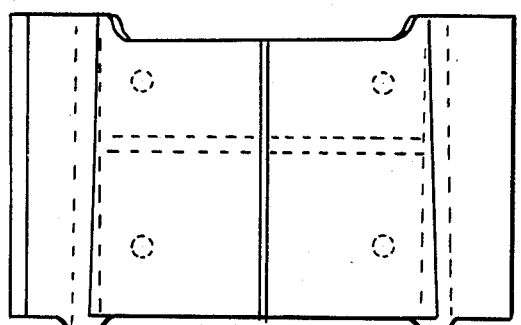
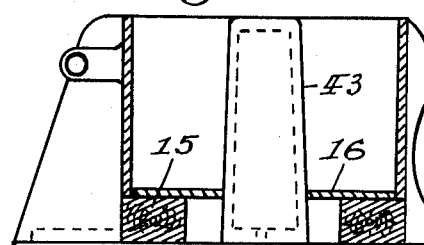
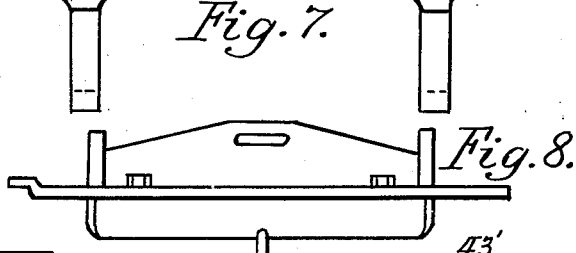
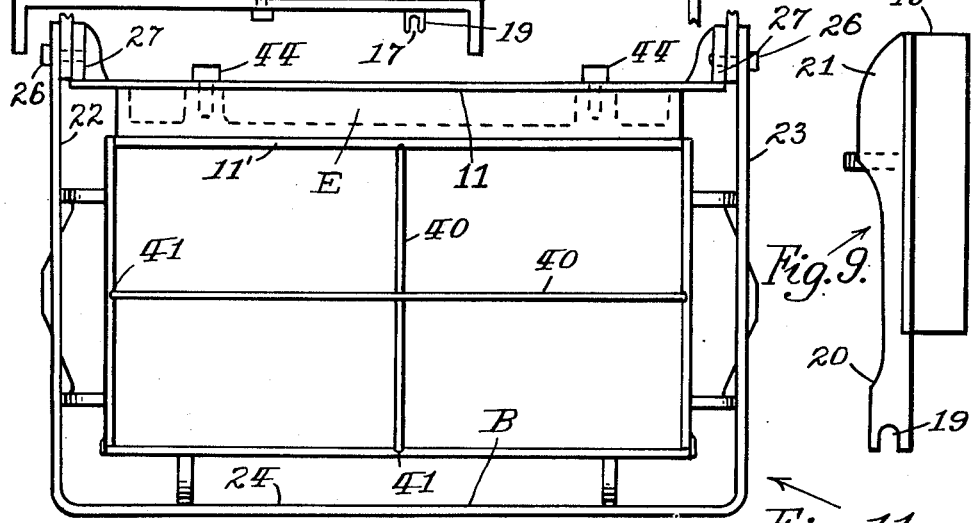
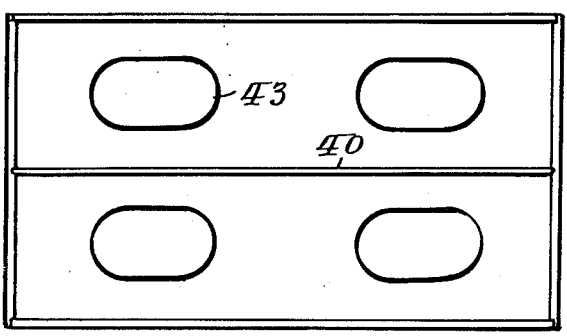
INVENTOR.
Audley R. Canfield
BY
Attorney.

Patented Dec. 26, 1950

2,535,389

UNITED STATES PATENT OFFICE 2,535,389

MACHINE FOR MOLDING CONCRETE BLOCK, BRICK, OR TILE

Audley R. Canfield, Lake Elmo, Minn.

Application March 8, 1948, Serial No. 13,656

2 Claims. (Cl. 25—41)

My invention relates to improvements in molding machines, the object being to provide a speedy and economical hand operable device which can be easily and quickly adjusted for molding blocks, bricks or tiles of various sizes and designs, answering requirements for various wall characteristics and types of construction.

Figure 3:
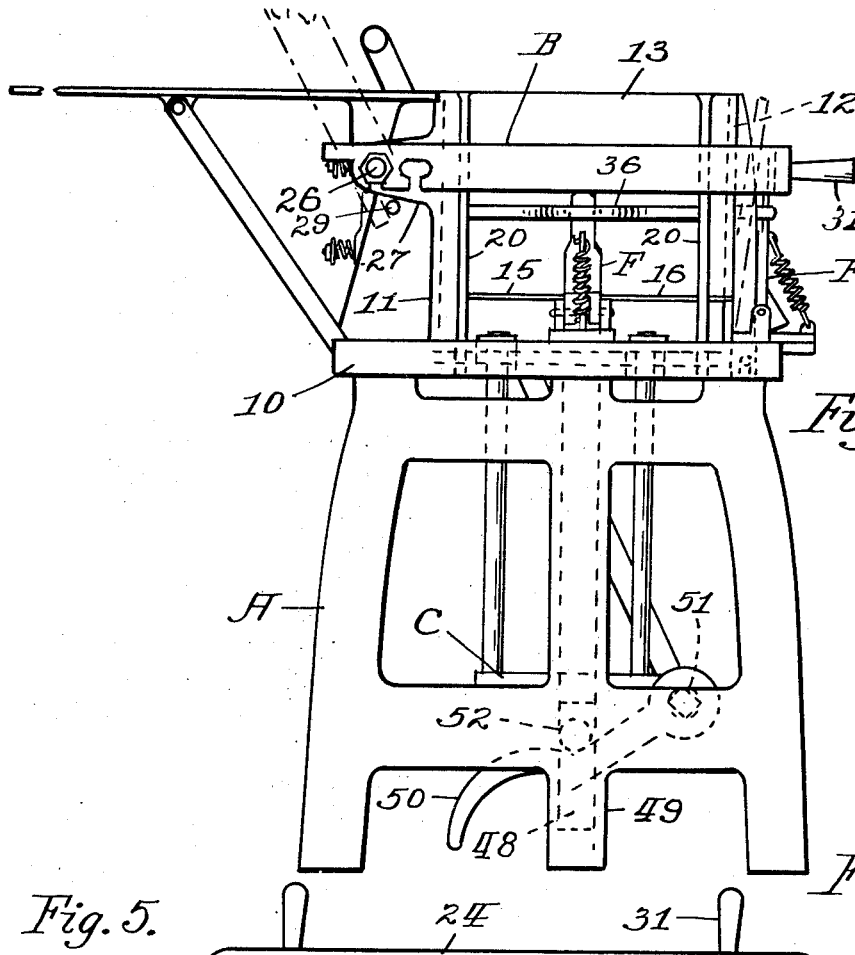
Figure 5:
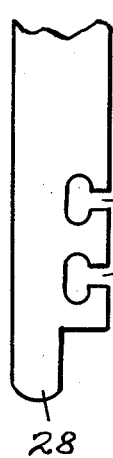
Figure 4:
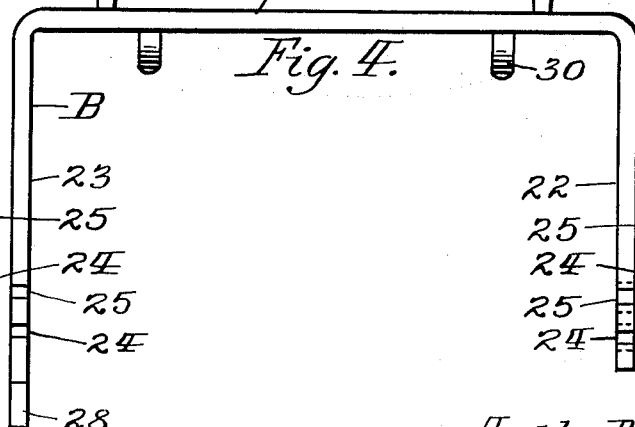
Figure 6:
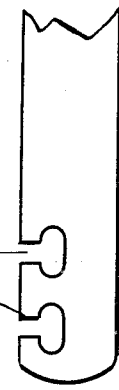

In the drawing showing my improvements, Fig. 1 is a front elevation of my improved machine; Fig. 2 is a plan of the structure shown in Fig. 1; Fig. 3 is a side elevation of said structure; Fig. 4 is a plan of the lock by which the side and end plates of the mold ar either held in operative position or released; Figs. 5 and 6 are side elevations, at enlarged scale, of detail portions of the lock; Fig. 7 is a side elevation of one type of mold plates; Fig. 8 is a plan of the structure shown in Fig. 7; Fig. 9 is an end elevation of the structure shown in Fig. 1, Fig. 10 is an elevation, in section of a detail at reduced scale, illustrating the mold, when adjusted to produce one type of block; Fig. 11 is a plan, illustrating the walls and split sub-divisions of the mold when adjusted for producing a plurality of blocks or bricks; Fig. 12 is a diagrammatic plan of another form of assembly of the parts of the mold; Fig. 13 is a side elevation of one of the plates which may be used to split or divide the mold; Fig. 14 is a side elevation of one of the spring actuators, which are adjustably secured to the surface of the base frame for automatically spreading the side and end plates of the mold into open position, when said plates are released by the hand operable lock; Fig. 15 is an end elevation of the structure shown in Fig. 14, and Fig. 16 is a plan of an alternative construction of the base plate which may be employed in the structure shown in Fig. 15.

In the drawings, A indicates one type of base, upon the table or top 10 of which are mounted back plate 11, front plate 12 and opposite end plates 13 and 14, all of which cooperate with a suitable horizontal spacer support 15 and mold board 16 (Fig. 10), in forming a mold or matrix. The back 11 is rigidly mounted on the table 10 of the frame and the remaining front and end plates 12, 13 and 14 are hinged and detachably secured to said table by a separable hinge connection, formed by integral horizontal pintles 17 across sockets 18 in the table and hinge seats 19 (Fig. 9) in the lower ends of pairs of upwardly extended arms 20 which depend downwardly from said plates.

In closed mold forming vertical position all of the mold plates are maintained in normal mold forming position by a lock or yoke B (Fig. 4), and after each molding operation the front and opposite end plates are released and allowed to swing and spread apart on their pintle connections by raising the lock yoke into the open broken line position shown in Fig. 3. In Fig. 2 a portion of the yoke is shown in raised position for the same purpose.

The table is provided with a plurality of suitably spaced pairs of pintles 17 and companion sockets 18, which are suitably spaced apart in pairs on each side portion of the table to engage corresponding hinge seats 19 on the lower ends of the front and end mold plates. In this manner mold plates of varying height, length and design are interchangeable to produce sizes and kinds of molded blocks, bricks and tiles by a single machine. The upwardly extending arms or ribs 20 are formed on their upper portions with downardly and outwardly slanting draw shoulders 21 (Fig. 9), with which the arms 22 and 23 and body portion 24 of the lock yoke B engage to close and releasably hold the mold plates in mold forming position.

The rearward ends of the side arms 22 and 23 of the lock are each provided with a pair of pintle seat engaging T slots 24 and 25 (Figs. 4 and 5), either of which can be engaged by horizontal pintles 26. The pintles 26 are supported by bosses 27 on the back wall (Fig. 3). The members of each set of these key slots open downwardly so that the axis position of hinging the yoke can be chosen to permit the mold cavity or matrix being of selectable width. Also the width of the mold cavity can be regulated by attaching a supplemental back section E (Fig. 11). The slot design in the lock B permits ready detachment of the lock yoke when desired but normally prevents unintended detachment. The detachment of the lock and changing the pintle position permits the substitution of mold plates of different lengths and widths so that blocks of varying size may be molded by a single machine. One arm 23 of the yoke is extended to provide a stop shoulder 28 which is adapted to engage a stop 29 on the back wall so as to limit the backward swinging position and hold the lock or yoke in upward and backwardly inclined position when raised. The lock or yoke B may be provided with depending leaf springs 30 (Fig. 4), for assisting in closing the walls of the mold but these are not usually necessary for the members of the lock or yoke may supply any necessary resilience for the purpose intended. The lock or yoke may also be provided with hand gripping members 31 for convenience in operating.

Spreading or stripping the mold is effectively provided by an actuator F having a tiltable upstanding arm 32 (Figs. 14, 15 and 16), for each tiltable side and front mold plate, said arm being hinged at its lower end at 33 on a base 34 and movable through a slot 35 (Fig. 2) in a horizontal rib 36 on each companion mold plate. Stops 37 on the lower end of arm 32 bearing against the surface of the base 34, limit outward swinging movement of the arm and thus define the outward stripping movement of the companion mold plate. A helical tractile spring 38, connected by its ends to the upper end of the arm 32 and to a boss 39 on the base, serves to tilt the mold plate outwardly and automatically free the molded article when the lock or yoke is raised. The base 34 may be extended and provided with an extra boss 39' (Fig. 16), to enable reversing the device in a different position so as to accommodate a tiltable mold plate in an adjusted position for molding blocks, bricks and tiles of different dimensions.

The stationary back wall 11 has a vibrator G of any suitable type and size mounted thereon, which in operation settles and packs cement mixture or other molding material automatically in the mold. This vibrator as shown is electrically operated and its use enables a stationary back wall being employed which transmits vibrating motion to the molding material which is a distinct advantage.

By making the spacer 15 of any suitable height the molded article may consequently be made out of block, brick or tile height. Also by employing splitting plates 40, either longitudinally as shown in Figs. 12 and 13 and/or laterally as shown in Fig. 11, the mold or matrix may be sub-divided to produce two or more molded articles of any block, brick or tile size. The splitting plate or plates employed may be held in vertical channels 41, or the individual splitting plates may be of the shape shown in Fig. 13. In this figure the upper end of the plate has extensions 42 which are intended to be let into upper slotted ends of the walls of the mold while the body of the splitting plate is held in the channels 41. The extensions 42 also serve as handles for convenience in withdrawing the spacers without disrupting the molded article. Cores such as 43, of any desired number and design may be employed in the molds between and/or on the side, back and end walls. In Fig. 9 the core 43' is shown on one of the front and side walls. The supplemental back wall 11' is shown in Fig. 11 provided on the supplemental section E which is detachably secured to the stationary back wall 11 by the bolts 44.

Arranged in the base frame A is pallet or mold board lifting mechanism C, which is adapted after each molding and stripping operation to be used for raising the pallet or mold board 16 and spacer 15 bearing the molded article into elevated position above the mold so that the pallet and molded article can be easily removed from the machine by hand. This lifting mechanism comprises a spider frame composed of four verticle thrust rods 45 sliding vertically through guide passages 46 in the table 10 and mounted at their lower ends on a carriage 47. The end guides 48 (Fig. 3) of the carriage travel vertically in channel members 49. Lifting cams, 50 are secured to the lifting shaft 51, which is rotatively supported on the body A. These cams are arranged to engage the carriage 47 below the antifriction rollers 52 thereon and thrust the lifting rods 45 upwardly. The upper ends of the lifting rods are adapted to engage below the spacer 15 and lift the palette 16 in the mold after each molding operation. This movement is imparted by turning the lifting shaft 51. The lifting shaft has movably secured to one end thereof an operating handle 53. Clearance is provided by a pivot connection 53 of said handle whereby the handle can be tilted laterally and made to engage below a catch 54 on the body frame and thus hold the lifting mechanism in raised position with the palette in the mold elevated.

As each empty mold is filled with molding material, the latter is settled and packed by the action of the agitator G, which vibrates the walls of the mold. When either blocks, bricks or tiles are being molded, a hopper (not shown), may if desired be placed over the upper end of the mold or matrix, in which position it may be held by any suitable means.

The machine thus provides a number of different assemblages of cores, side and end mold plates, together with cooperating means by which these parts are adapted to function and produce blocks, bricks, tiles or other articles of varying design, construction and size, out of concrete, adobe and other molding material. The machine also provides simple, speedy and efficient means for use particularly by a builder, contractor or other individual for making his own building blocks, bricks and tiles, quickly with minimum expense and labor.

Modifications are contemplated within the scope of the following claims.

I claim:

1. In a machine for molding articles, the combination with a supporting frame, a mold carried thereby comprising a stationary back, laterally extended pintles at opposite end portions of said back, a removable mold board, front and end plates hinged and removably connected to said frame above said mold board so as to tilt and spread outwardly and release a molded article from within, and a lock yoke for engaging and holding said front and end plates respectively of different lengths in closed mold forming position above said mold board, said lock yoke having a pair of side arms and a plurality of longitudinally spaced pairs of pintle receiving key slots in the outer end portions of said arms whereby the lock yoke can be readily detached and selectively hinged on said stationary back so as to engage and hold substitute side and end mold plates varying in length and to permit replacement of front and end plates suitable to produce molded articles varying in size.

2. In a structure as defined in claim 5, each of the key slots in the arms of said lock yoke being T shaped to provide a double pintle engaging socket for retaining the yoke engaged in either raised or lowered position.

AUDLEY R. CANFIELD.

REFERENCES CITED

The following references are of record in the file of this patent:

UNITED STATES PATENTS

| Number | Name | Date |
| --- | --- | --- |
| 1,050,804 | Canfield | Jan. 21, 1913 |
| 2,303,884 | Krehbiel et al. | Dec. 1, 1942 |